US010476839B2

(12) United States Patent
Madhayyan et al.

(10) Patent No.: US 10,476,839 B2
(45) Date of Patent: Nov. 12, 2019

(54) DATAPATH TRIGGERED ON-DEMAND NFV SERVICE ACTIVATION

(71) Applicant: CISCO TECHNOLOGY, INC., San Jose, CA (US)

(72) Inventors: Muthumayan Madhayyan, San Jose, CA (US); Ganesh Sundaram, San Jose, CA (US); Chiajen Tsai, Cupertino, CA (US); Larry T. Chang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 15/433,917

(22) Filed: Feb. 15, 2017

(65) Prior Publication Data

US 2018/0048716 A1    Feb. 15, 2018

Related U.S. Application Data

(63) Continuation of application No. 62/375,116, filed on Aug. 15, 2016.

(51) Int. Cl.

| G06F 15/173 | (2006.01) |
|---|---|
| H04L 29/12 | (2006.01) |
| H04L 12/24 | (2006.01) |
| H04L 29/08 | (2006.01) |
| G06F 9/455 | (2018.01) |

(52) U.S. Cl.
CPC .......... *H04L 61/2015* (2013.01); *G06F 9/455* (2013.01); *G06F 9/45558* (2013.01); *H04L 41/0806* (2013.01); *H04L 67/16* (2013.01); *G06F 2009/45587* (2013.01); *G06F 2009/45595* (2013.01); *H04L 61/2007* (2013.01); *H04L 67/10* (2013.01)

(58) Field of Classification Search
CPC . H04L 61/2015; H04L 41/0806; H04L 67/16; H04L 61/2007; H04L 67/10; G06F 9/455; G06F 9/45558; G06F 2009/45587; G06F 2009/45595
USPC .......................................................... 709/224
See application file for complete search history.

(56) References Cited

U.S. PATENT DOCUMENTS

| 9,374,267 B2* | 6/2016 | Poirier ................ H04L 61/2528 |
| 9,578,008 B2* | 2/2017 | Sood ....................... H04L 63/08 |
| 9,736,111 B2* | 8/2017 | Lopez Da Silva .......................... H04L 12/2818 |

(Continued)

FOREIGN PATENT DOCUMENTS

WO    WO 2016/102297    6/2016

OTHER PUBLICATIONS

Smith, S., "On-Demand Activation of Docker Containers with Systemd," Systemd DevOps Docker, Mar. 4, 2015, 10 pages.

(Continued)

*Primary Examiner* — Melvin H Pollack

(57) ABSTRACT

Systems and methods for triggering service activation include starting a vCPE instance in response to a request for a service, instantiating a service container for the requested service and starting the service in the service container, installing a fast path entry for the service container in a local bridge table, detecting an idle timeout of the service and labeling the local bridge table entry for the corresponding service container as inactive, notifying a cloud services manager that the service container is inactive, and removing the service container.

20 Claims, 8 Drawing Sheets

(56) References Cited

U.S. PATENT DOCUMENTS

| | | | |
|---|---|---|---|
| 9,882,833 B2* | 1/2018 | McBride | H04L 47/762 |
| 9,894,165 B2* | 2/2018 | Yazir | G06F 16/245 |
| 9,936,047 B2* | 4/2018 | Adolph | H04L 12/4641 |
| 9,948,493 B2* | 4/2018 | Fargano | H04L 43/08 |
| 9,961,138 B2* | 5/2018 | Lelacheur | H04L 67/101 |
| 9,986,453 B2* | 5/2018 | Persson | H04B 17/318 |
| 9,992,271 B2* | 6/2018 | Allan | H04L 67/10 |
| 10,002,011 B2* | 6/2018 | Lissack | H04L 41/5054 |
| 10,042,665 B2* | 8/2018 | Puranik | G06F 9/45558 |
| 10,044,525 B2* | 8/2018 | Gaddehosur | H04L 12/4675 |
| 10,063,666 B2* | 8/2018 | Wei | G06F 9/00 |
| 10,078,528 B2* | 9/2018 | Bugenhagen | G06F 9/45558 |
| 10,084,643 B2* | 9/2018 | Zhang | H04W 4/70 |
| 10,122,829 B2* | 11/2018 | Saavedra | H04L 47/24 |
| 10,171,417 B2* | 1/2019 | Synnergren | H04L 61/2061 |
| 2016/0020962 A1* | 1/2016 | Carey | H04L 41/5054 709/223 |
| 2016/0205518 A1 | 7/2016 | Patel et al. | |
| 2016/0301566 A1* | 10/2016 | Ramasubramani | H04L 65/1069 |
| 2017/0111274 A1* | 4/2017 | Bays | H04L 45/74 |
| 2017/0187607 A1* | 6/2017 | Shaikh | H04L 45/02 |
| 2017/0250892 A1* | 8/2017 | Cooper | G06F 21/44 |
| 2017/0366605 A1* | 12/2017 | Chang | H04L 47/70 |
| 2018/0146031 A1* | 5/2018 | Li | H04L 41/0806 |
| 2018/0225139 A1* | 8/2018 | Hahn | G06F 9/45558 |
| 2018/0227182 A1* | 8/2018 | Patton et al. | H04L 41/0806 |
| 2018/0239648 A1* | 8/2018 | Formanek | G06F 9/45558 |
| 2018/0262431 A1* | 9/2018 | Zhang | H04L 41/0806 |
| 2018/0309626 A1* | 10/2018 | Andrianov | H04L 41/0896 |
| 2018/0309824 A1* | 10/2018 | Gkellas | H04L 41/0806 |
| 2018/0351652 A1* | 12/2018 | Ashrafi | H04B 10/616 |
| 2019/0007899 A1* | 1/2019 | Vrzic | H04W 48/18 |
| 2019/0028573 A1* | 1/2019 | Cook | H04L 69/16 |
| 2019/0052549 A1* | 2/2019 | Duggal | H04L 41/5045 |
| 2019/0058636 A1* | 2/2019 | Xia | H04L 41/0893 |

OTHER PUBLICATIONS

"vCPE Evolution Path," Accedian Networks, White Paper, Mar. 2015, 20 pages.
"Horizontal Pod Autoscaling," The Linux Foundation, Published on or about Feb. 6, 2017, 5 pages.

* cited by examiner

DATAPATH TRIGGERED ON-DEMAND NFV SERVICE ACTIVATION

CROSS-REFERENCE TO RELATED APPLICATION

This Application claims the benefit of priority under 35 U.S.C. § 120 of U.S. application Ser. No. 62/375,116 filed Aug. 15, 2016, and entitled "Datapath Triggered On-Demand NFV Service Activation", naming Muthumayan Madhayyan, et al., as inventors. The disclosure of the prior Application is considered part of and is incorporated by reference in the disclosure of this Application.

TECHNICAL FIELD

This disclosure relates in general to the field of communications and, more particularly, to on-demand NFV (Network Function Virtualization) service activation for consumer equipment.

BACKGROUND

As increasing numbers of network functions have been virtualized, various solutions for resource elasticity in NFV have been implemented. In one example, heuristics are used to implement a scaling mechanism for dynamic provisioning and scaling of individual or groups of VNFs (virtual network functions) within a data center. However, effectively relying on heuristics to implement a scaling mechanism requires planning. In another example, container-based orchestration infrastructures, such as Kubernetes, are used for turning up service containers. However, even with these infrastructures, the trigger to scale is based on heuristics such as CPU utilization. A further example for on-demand resource availability is socket activation. However, socket activation and other container creation implementations are narrowly focused on specific applications, such as web applications.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
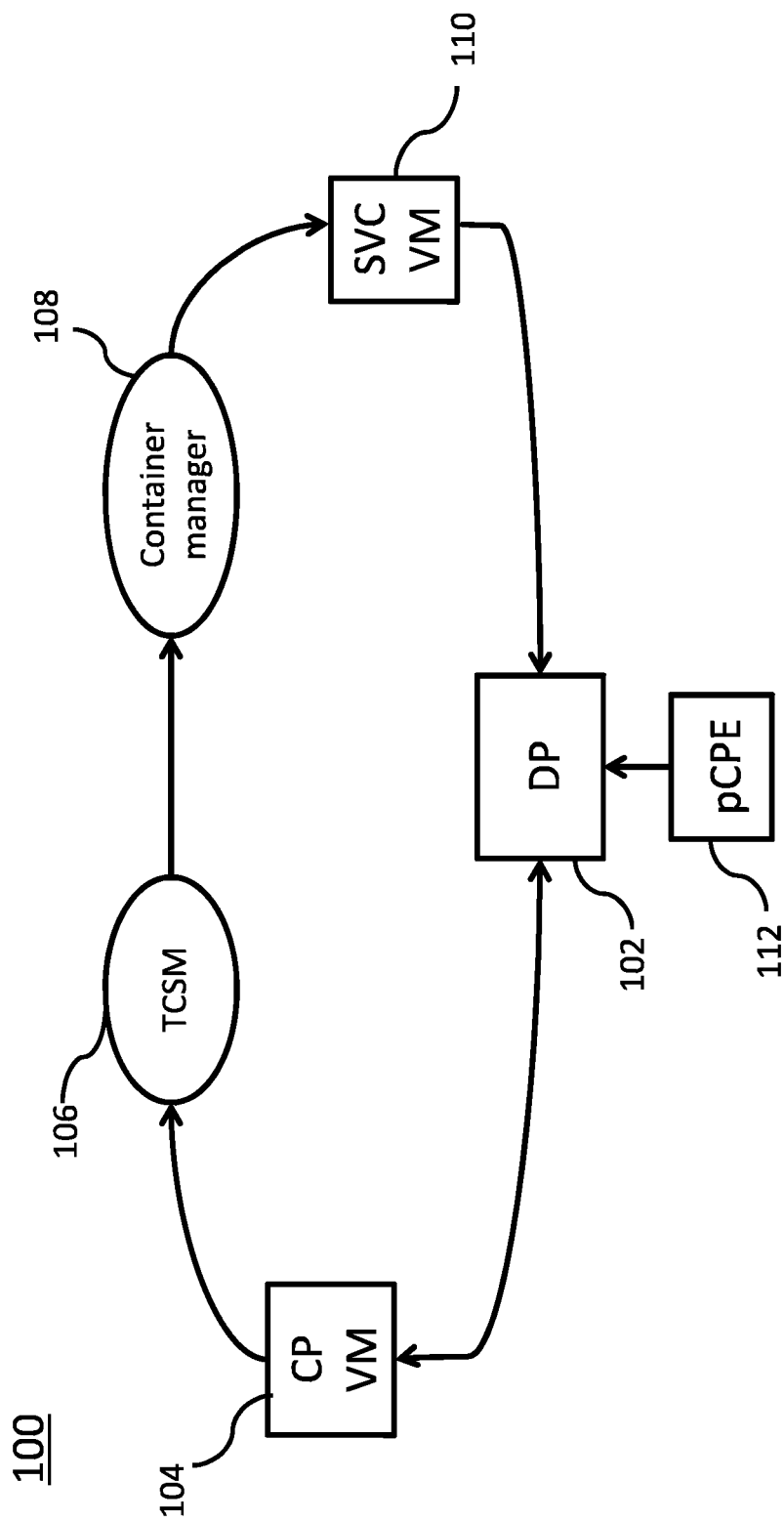
FIG. 1 is a diagram illustrating a system for providing on-demand service activation, according to some embodiments of the present disclosure.

According to various aspects, a solution for on-demand resource elasticity is discussed. In particular, a virtual solution leverages resource elasticity that is inherent to virtualization technologies and uses the inherent resource elasticity to provide on-demand services. Providing on-demand services allows for efficient utilization of resources. There are multiple methods for achieving LAN based services such as virtual Network Attached Storage (vNAS) and virtual Media (vMedia). One example of a vMedia server is a Plex server.

According to one implementation, a method for triggering network function virtualization service activation for consumer equipment, comprises starting, by a cloud services manager, a vCPE instance in response to a request for a service, instantiating, by a container manager, a service container for the requested service and starting the service in the service container, installing, by a datapath engine, a fast path entry for the service container in a local bridge table, detecting, by the datapath engine, an idle timeout of the service and labeling the local bridge table entry for the corresponding service container as inactive, notifying the cloud services manager that the service container is inactive, and removing, by the container manager, the service container.

In some implementations, the method further includes detecting, by the datapath engine, data flow to the service container and data flow from the service container. In some implementations, detecting an idle timeout includes detecting, at the datapath engine, a lack of data flow to and from the service container. In some implementations, the method includes reporting data flow information to the vCPE. In one implementation, the method includes installing a rule in the datapath engine to report, to the vCPE, a lack of data flow to and from the service container.

In some implementations, the method includes sending, from the container manager to the vCPE, a DHCP request for an IP address for the service container, and assigning the IP address to the service container, wherein the fast path entry includes the assigned IP address.

In some implementations, the method includes receiving, at a control plane, a DHCP request from a physical customer premises equipment (pCPE), assigning, by the control plane, an IP address to the pCPE, and adding, at the datapath engine, the IP address entry to the local bridge table.

In some implementations, the method includes receiving a subscriber request for access to the service, notifying the vCPE of wake-up of the requested service, and instantiating, by the container manager, a new service container for the requested service and starting the service in the new service container.

In some implementations, a network device for triggering service activation includes a processor for receiving service requests and instantiating virtual equipment, a vCPE that when instantiated by the processor is configured to start a service in a service container, and a datapath engine, coupled to the processor, and comprising a memory for storing a local bridge table. The datapath engine is configured to install a fast path entry for the service container in the local bridge table, detect an idle timeout of the service and flag the local bridge table entry as inactive, and send the vCPE notification of the idle timeout of the service. When the vCPE receives the notification of the timeout of the service, the vCPE triggers removal the service container.

In some implementations, the datapath engine is further configured to detect data flow to the service container and data flow from the service container, and wherein detecting an idle timeout includes detecting, at the datapath engine, a lack of data flow to and from the service container.

In one implementation, the datapath engine is further configured to report data flow information to the vCPE. In some implementations, when the datapath engine receives a subscriber request for access to the service, the datapath engine is configured to send the vCPE notification of wake-up of the service, and the vCPE is further configured to instantiate a new service container for the service and start the service in the new service container.

In some implementations, the processor is configured to receive a DHCP request from a physical customer premises equipment (pCPE), and assign an IP address to the pCPE, wherein the datapath engine is configured to add the IP address entry to the local bridge table.

In some implementations, a computer-readable non-transitory medium comprises one or more instructions for on-demand network function virtualization service activation, that when executed on a processor configure the processor to perform one or more operations comprising starting a vCPE instance in response to a request for a service, instantiating a service container for the requested service and starting the service in the service container, installing, by a datapath engine, a fast path entry for the service container in a local bridge table, detecting an idle timeout of the service and labeling the local bridge table entry for the corresponding service container as inactive, notifying the vCPE instance that the service container is inactive, and removing the service container.

In some implementations, the one or more operations include detecting, by the datapath engine, data flow to the service container and data flow from the service container. In some examples, the one or more operations further comprise reporting data flow information to the vCPE. In some implementations, detecting an idle timeout includes detecting, at the datapath engine, a lack of data flow to and from the service container.

In some implementations, the one or more operations further comprises installing a rule in the datapath engine to report, to the vCPE, a lack of data flow to and from the service container. In some implementations, the one or more operations further include receiving, at a control plane, a DHCP request from a physical customer premises equipment (pCPE), assigning, by the control plane, an IP address to the pCPE, and adding, at the datapath engine, the IP address entry to the local bridge table.

In some implementations, the one or more operations further include receiving a subscriber request for access to the service, notifying the vCPE of wake-up of the requested service, and instantiating, by the container manager, a new service container for the requested service and starting the service in the new service container.

In some implementations, a network device for triggering service activation includes a processor for receiving service requests and instantiating virtual equipment, a vCPE that when instantiated by the processor is configured to start a service in a service container, and means for installing a fast path entry for the service container in a local bridge table, detecting an idle timeout of the service, flagging the local bridge table entry as inactive, and sending the vCPE notification of the idle timeout of the service. When the vCPE receives the notification of the timeout of the service, the vCPE triggers removal the service container.

Network Environment: Basics of NFV

As virtualization technologies transition from virtual machines to leaner and faster containers, it is desirable to provide services that can be personalized per user. For example, in residential broadband, each residential user may use different services. Similarly, in residential broadband, each residential user may use different variations of a given service. In other examples, small- and medium-sized business solutions, as well as small office and home office solutions, may require different degrees of customization. Traditional technologies allow for customization of service provisions, but customization is based on heuristics and requires advanced planning. Customization can be based on a subscriber ranking or subscriber class, such as first/second/third class or gold/silver/bronze. Assigning subscribers to a particular class requires advanced planning. Heuristics can be used to dimension servers associated with a type of service based on anticipated usage patterns. For example, for a subscribes-consumable service like streaming video, servers are associated with the streaming video service, and dimensioned based on anticipated usage patterns. In one example, a server for a streaming video service can handle a load of about one hundred subscribers.

Virtualization infrastructure can handle services that scale with the number of broadband customers. Thus, millions of containers are managed within a few physical servers. While this scale of packing allows for a high degree of customization, it results in wasted resources when service containers that are infrequently used remain constantly active. To increase the efficiency of virtualization infrastructure, resource usage can be optimized by inactivating resources that are not in use.

When using containers, a service container is created for each subscriber. According to some implementations as discussed herein, the container is started on demand with no advanced planning. When the service becomes inactive, the container is terminated.

The datacenter industry employs some techniques to optimize resources. However, despite current optimization attempts, in many instances, service containers remain present despite only being active for a fraction of the lifetime of a subscriber broadband usage. For example, some service containers are active for less than 1% of the lifetime of a subscriber broadband usage. One example is a residential security camera that accesses storage services very infrequently. According to various examples, starting virtual appliance service containers on an as-needed basis, and removing inactive service containers, cuts down on valuable compute and memory resources.

Elasticity in resource usage is a hallmark of virtualized infrastructure using virtual machines (VMs). However, using traditional methods for elasticity in resource usage take a significant amount of time. Additionally, traditional resource elasticity methods for scaling up and scaling down resources cannot be performed as a just-in-time activity.

Proposed Solution for On-demand NFV Service Activation

According to various aspects, the capabilities of a datapath engine are leveraged to raise intelligent triggers that aid a control plane in managing the lifecycle of service appliance containers, allowing the control plane to instantiate containers when needed and remove containers that are inactive. In virtualized customer premises equipment (vCPE), traffic originating from a customer's end devices flows through the vCPE. The vCPE manages assignment of IP addresses and redirection of traffic to service containers. Thus, the vCPE has information regarding when a selected service is accessed and when the selected service is idling. The information regarding the state of various services can be used to optimize resource usage. In on example, when a selected service is accessed, a corresponding service container is activated, and when a selected service is idling, the corresponding service container is removed.

FIG. 1 is a diagram illustrating a system 100 for providing on-demand service activation, according to some embodiments of the present disclosure. In FIG. 1, at a control plane 104, a first vCPE instance is started by a cloud services manager 106 (TCSM). The first vCPE instance is given a LAN IP address by the vCPE's internal DHCP server, and the IP address for the first vCPE is entered in a table (along with the associated vCPE) in the datapath engine 102.

The TCSM 106 starts optional services associated with the vCPE. The optional services may include, for example, VNAS, vMedia, Internet of Things gateway (IoTG) services, virtual PBX, virtual interactive voice response (IVR) systems, and virtual security camera services. The optional services started by the TCSM 106 are sent to a container management module 108, which instantiates a container for each service in the service virtual machine 110. In various examples, for a VNAS service, a VNAS service container is instantiated in the service virtual machine 110, for a vMedia service, a vMedia service container is instantiated in the service virtual machine 110, and for an IoTG service, and IoTG service container is instantiated in the service virtual machine 110. According to various examples, the container management module 108 manages deployment, scaling, and operations of containers. In one example, the container management module 108 is a Kubernetes manager. Kubernetes is an open-source platform for automating deployment, scaling, and operations of application containers across clusters of hosts, providing container-centric infrastructure. In other examples, the container manager 106 is another container management platform.

For each container instantiated in the service virtual machine 110, a Dynamic Host Configuration Protocol (DHCP) request is sent to the corresponding vCPE. The vCPE is a virtualized instance of a physical CPE, and is started as a container when the subscriber is onboarded through a management system. One component of the vCPE is the sCP (subscriber control plane). The sCP manages the IP address allocation to the home devices. An IP address is assigned to each container by the sCP. The sCP enters the assigned IP address (along with the associated service container) in the table in the datapath engine 102.

Additionally, physical customer premises equipment (pCPE) 112 can also send DHCP requests to the control plane 104 and be given LAN IP addresses for entry in the table in the datapath engine 102. According to various examples, the pCPE 112 may include physical devices, such as printers, laptops, tablets, phones, scanners, cable boxes, and routers. Thus, the control plane installs fast path entries in the table in the datapath engine 102 when a DHCP request is received for IP addresses to virtual services and physical devices. Each device receives an entry in the local bridge.

According to one example, the on-demand service is a VNAS service. The vNAS service is deployed as a single-tenant VNF service, and it is started on-demand. When a subscriber CPE accesses the vNAS service via the subscriber LAN, the datapath engine (DP) forwards the flow to the sCP. The sCP initiates the start of a micro-service vNAS container and then programs an entry to forward traffic to the newly created vNAS container. The datapath engine 102 monitors the state of each customer flow. When a packet on a flow does not arrive within a certain time period, the datapath engine 102 declares inactivity of that customer flow. Thus, after a period of time during which the vNAS service is inactive, the vNAS service is marked as an idle timeout in the table in the datapath engine 102. The sCP may request the datapath engine 102 to deprogram the vNAS flow by marking it as inactive in the datapath engine table, and then initiate destroy of the micro-service container. Thus, in many examples, only one vNAS instance per subscriber is hosted at a time. In some examples, there are multiple subscribers and multiple vNAS instances are hosted at a time (one per subscriber). In some implementations, this approach is used for micro-services that are mostly dormant. For example, the method may be used for micro-services that are active for less than one percent of the vCPE lifetime. Various examples of applicable micro-services include vNAS, IoT gateway, and vMedia. In one example, vNAS is deployed as a multi-tenant VNF service. In another example, vNAS is deployed as a single-tenant VNF service. According to some examples, on-demand service activation as described herein optimizes resource utilization, though it may add additional orchestration complexity.

Figure 2:
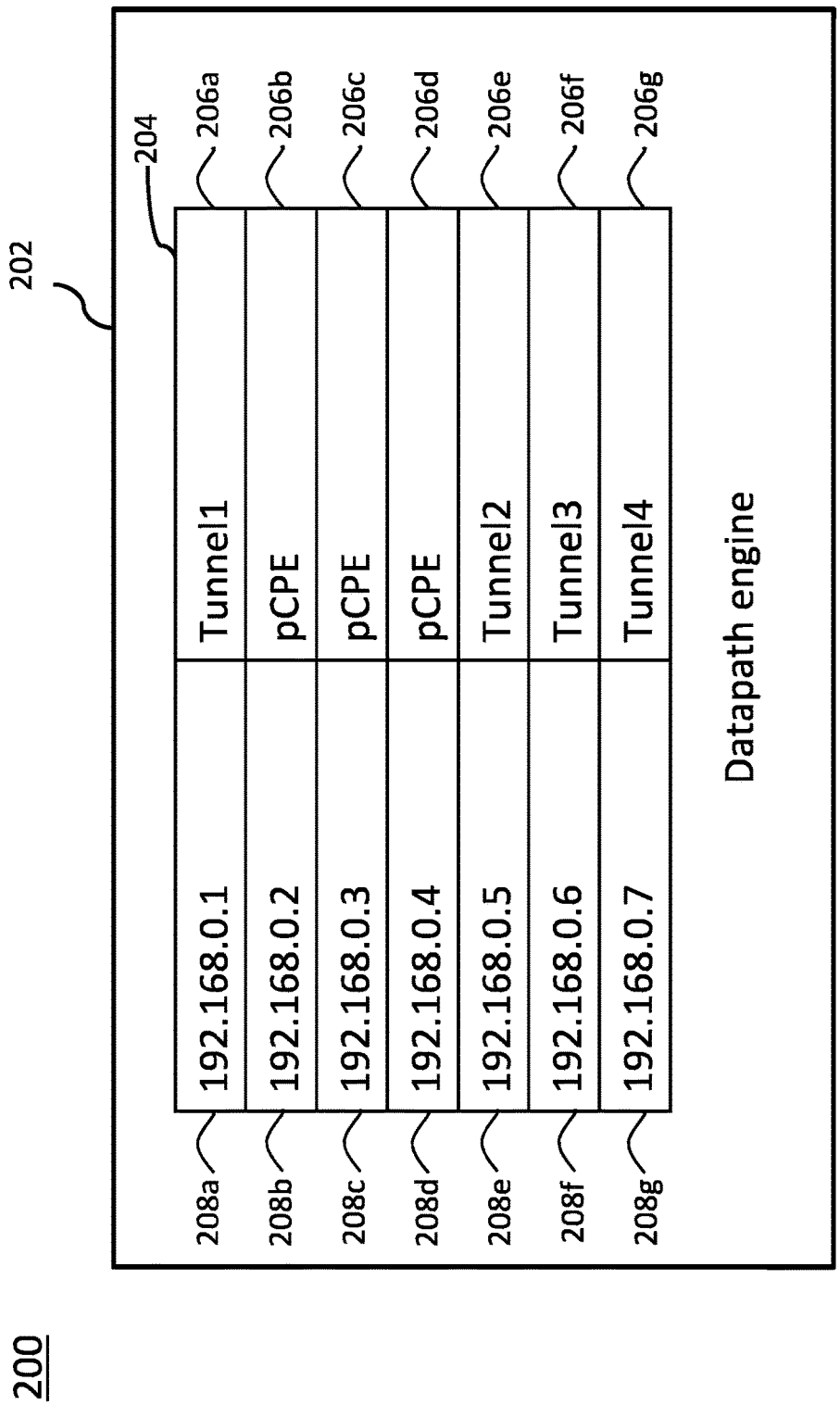
FIG. 2 is a diagram illustrating a datapath engine, according to some embodiments of the present disclosure.

FIG. 2 is a diagram 200 illustrating a datapath (DP) engine 202, according to some embodiments of the present disclosure. The datapath engine 202 contains a table 204, which records the IP addresses of various subscribers, services, and devices. As shown in the table 204, each respective subscriber, service, and device 206a-206g has an associated IP address 208a-208g. As shown in right-hand column of the table 204, the subscriber CPEs and services are labeled as tunnels (Tunnel1 206a, Tunnel2 206e, Tunnel3 206f, and Tunnel4 206g), while devices are labeled as pCPEs 206b-206d.

The subscriber CPEs and services are called tunnels because their IP packets ("inner IP packets") are encapsulated as a payload in another IP packet ("outer IP packet"). The outer IP packet is routed, and may go through multiple routing hops, and when it reaches its destination, the outer IP packet header is stripped off, and the inner IP packet is delievrd. The outer IP packet is said to behave as a tunnel for the inner IP packet; the inner IP packet enters the tunnel and exits the tunnel.

In one example, the first entry in the table 204, Tunnel 206a, lists the IP address 208a for a vCPE, and the fifth-seventh entries in the table 204, Tunnels 206e-206g, list the IP addresses 208e-208g for a VNAS service, a vMedia service, and an IoTG service, respectively. In one example, the services in the fifth-seventh table 204 entries 206e-206g are services associated with the vCPE in the first entry 206a. The datapath engine table includes entries from multiple subscriber flows, and the table entries include information about subscriber and sCPE attributes.

According to various implementations, the datapath engine is a high throughout datapath engine and handles the datapath traffic. The datapath engine is capable of handling multiple flows from multiple subscribers. In some examples, the subscribers are residential subscribers, and in other examples, the subscribers are business subscribers.

According to one aspect, the datapath engine reports constant statistical and health information on data flows to the respective vCPE with which the data flows are associated. For example, the data flows may include data flows from the vCPE itself, as well as data flows to and from services associated with the vCPE. Additionally, the vCPE can install specific rules in the datapath engine to report inactivity of specific flows and discovery of new flows. In one example, the table in the datapath engine includes a column indicating, for each entry, whether the entry is active or inactive. In some examples, the datapath engine 102 reports statistical information regarding pCPEs to the related vCPEs. In various examples, a pCPE includes agents that report its statistics to the related vCPE.

The vCPE can leverage information from datapath engine reports to trigger creation and deletion of specific service containers. Thus, since the start and stop of services containers happens in the order of a few seconds (as opposed to minutes in VMs), using a datapath engine to record and report service container activities to an associated vCPE allows the vCPE to control computing and memory resources. The containers can be in VMs, which are pre-started, and the containers are started and stopped on demand. A vCPE can use the activity information from the datapath engine to instantiate service containers on demand, and direct removal of inactive containers.

According to various implementations, the infrastructure described herein can be used to trigger higher level software defined network (SDN) controllers (that operate beyond simple subscriber management) to enable more sophisticated applications that can apply policies or detect anomalies at scale. In some examples, dynamic policy and/or dynamic logic is applied in TCSM based on infrastructure triggers forwarded from the DP and the CP. The dynamic policy and/or logic is selectively propagated to external entities such as SDN.

Figure 3:
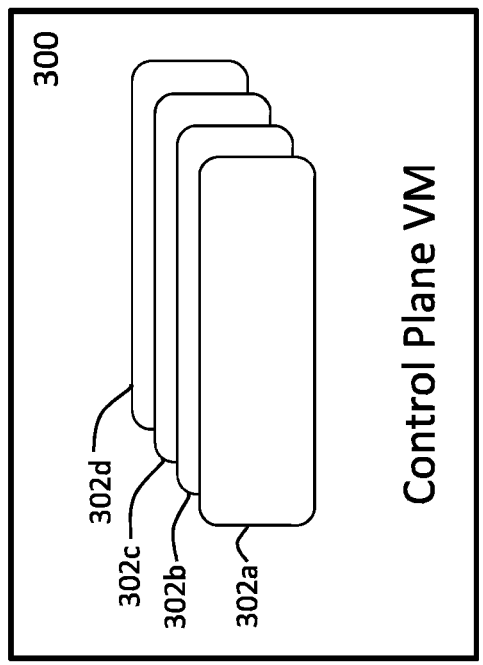
FIG. 3 is a diagram illustrating a control plane virtual machine, according to some embodiments of the present disclosure.

FIG. 3 is a diagram illustrating a control plane virtual machine (VM) 300, according to some embodiments of the present disclosure. The control plane VM 300 is a detailed illustration of the control plane 104 of FIG. 1. The control plane VM 300 includes multiple subscriber control planes 302a-302d, and each subscriber control plane 302a-302d corresponds to a selected subscriber. Each subscriber control plane 302a-302d can request instantiation and removal of subscriber-specific services, such as VNAS, vMedia, and IoTG services. Thus, referring back to FIG. 1, when multiple subscriber control planes 302a-302d request services, service containers are instantiated in the service VM 110 for each new service from each subscriber CP 302a-302d.

Figure 4:
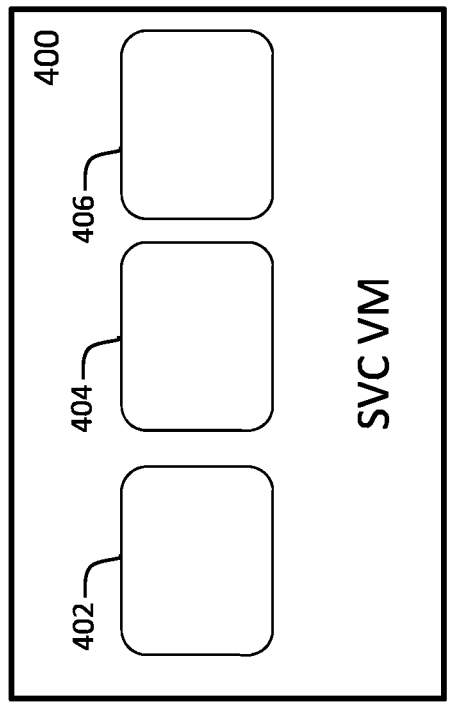
FIG. 4 is a diagram illustrating a service virtual machine, according to some embodiments of the present disclosure.

FIG. 4 is a diagram illustrating a service (SVC) virtual machine (VM) 400, according to some embodiments of the present disclosure. The SVC VM 400 includes a first container 402, a second container 404, and a third container 406. According to one example, the first container 402 is a VNAS container, the second container 404 is a vMedia container, and the third container 406 is an IoT Gateway container. Thus, the VNAS container runs a VNAS service, the vMedia container runs a vMedia service, and the IoT Gateway container runs an IoT Gateway service. In one example, each of the first 402, second 404, and third 406 containers correspond to the same subscriber. In other examples, the SVC VM 400 includes multiple containers for any selected service, with each container corresponding to a service from one of multiple sCPs 302a-302d. In some implementations, a container management service can add and remove containers from the SVC VM 400 as requested by the corresponding subscriber control plane.

Figure 5:
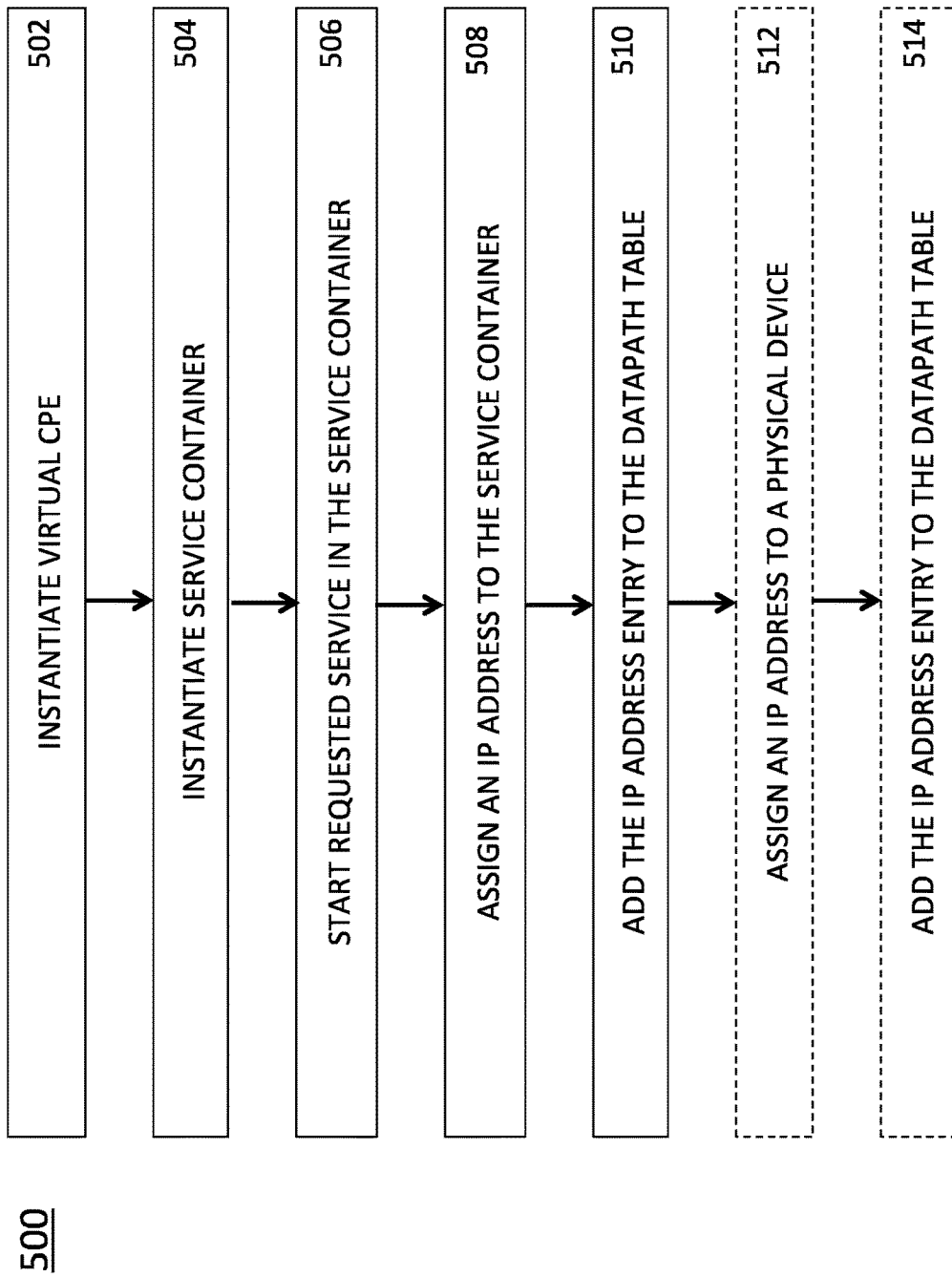
FIG. 5 is a flow chart illustrating a method for providing on-demand service activation, according to some embodiments of the present disclosure.

FIG. 5 is a flow chart illustrating a method 500 for providing on-demand service activation, according to some embodiments of the present disclosure. At step 502, a virtual CPE is instantiated. In one example, the vCPE is instantiated in the cloud, in a container within a VM. The vCPE may be started by a cloud services manager at a control plane. The vCPE may request a service, such as VNAS, vMedia and IoT Gateway services, and the cloud services manager instantiates one or more requested services. At step 504, a service container is instantiated for the requested service by a container manager. At step 506, the requested service is started in the service container. At step 508, an IP address is assigned to the service container. The IP address is assigned by the control plane. At step 510, the IP address is added as an entry to a table in the datapath engine. As described above, the datapath engine includes a table of IP addresses. A physical CPE may also request an IP address, and, optionally, at step 512, an IP address is assigned to a pCPE. At step 514, the pCPE IP address is added to the table in the datapath engine.

Figure 6:
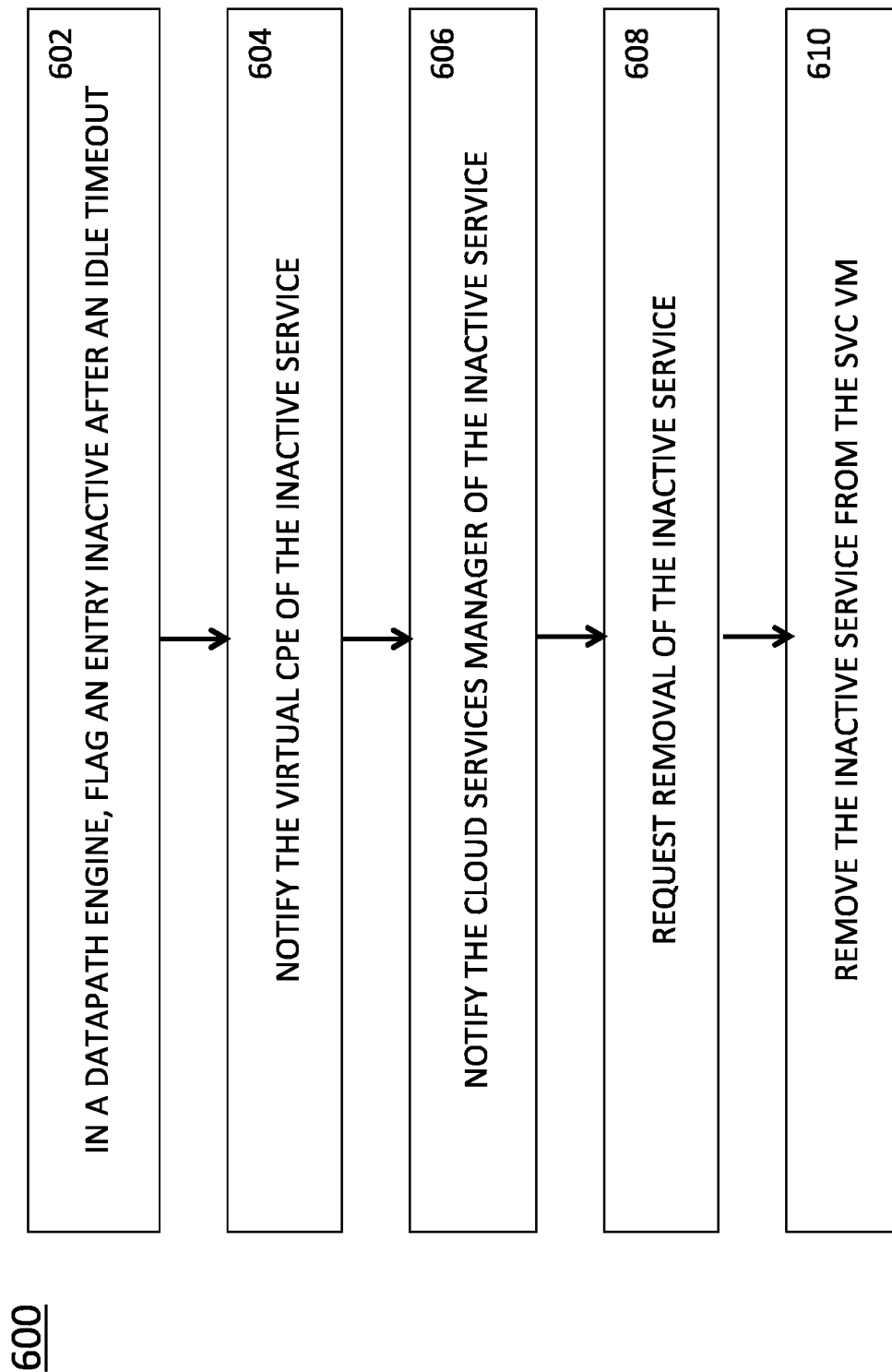
FIG. 6 is a flow chart illustrating a method for removal of inactive services, according to some embodiments of the present disclosure.

FIG. 6 is a flow chart illustrating a method 600 for removal of inactive services, according to some embodiments of the present disclosure. At step 602, an entry in a table in a datapath engine is flagged inactive after an idle timeout. At step 604, the vCPE associated with the inactive service entry is notified of that the service is inactive. At step 606, the sCP component of the vCPE notifies the cloud services manager of the inactive service. At step 608, the cloud services manager requests removal of the service container associated with the inactive service from the SVC VM. At step 610, the container manager removes the container associated with the inactive service from the SVC VM.

Figure 7:
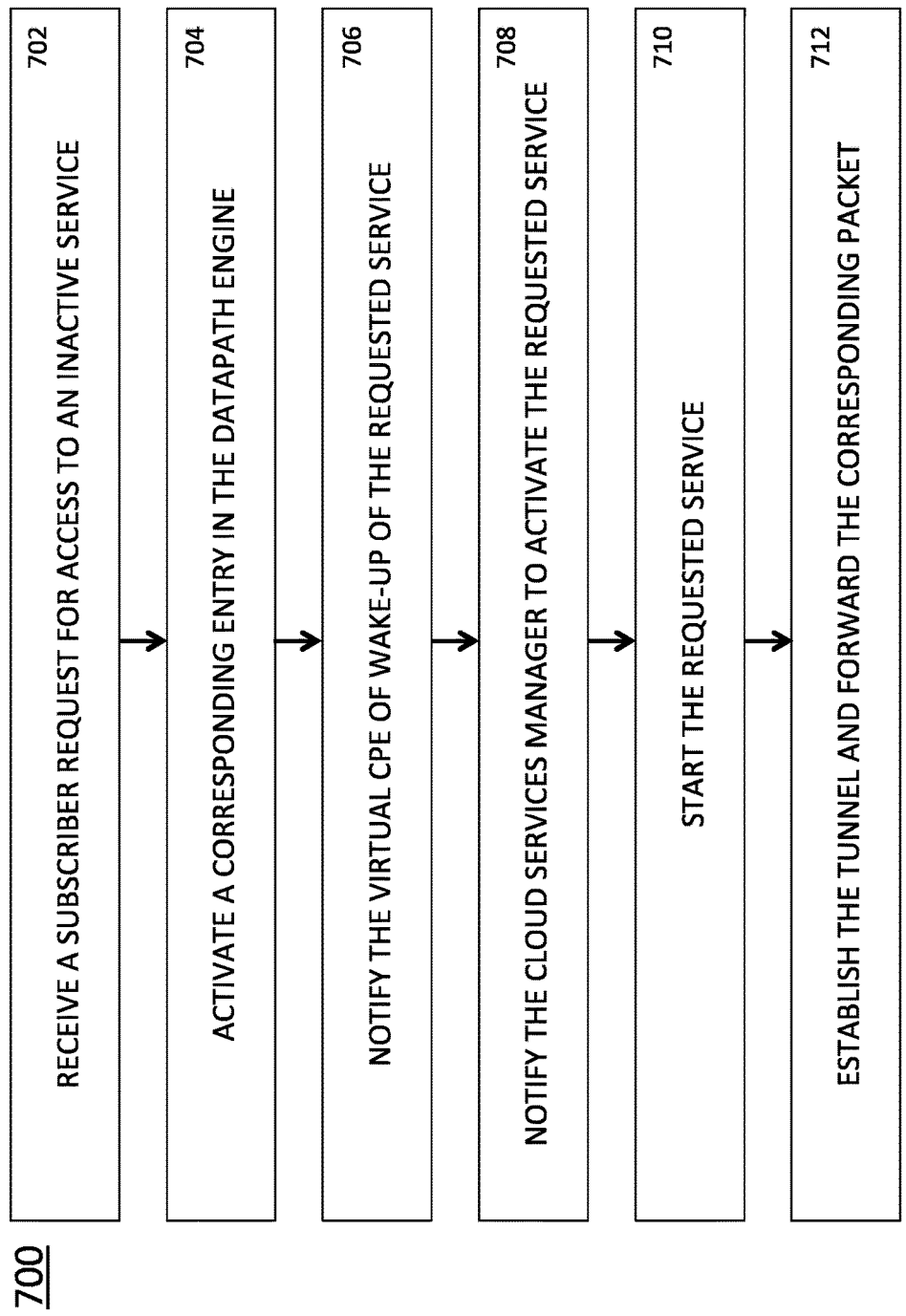
FIG. 7 is a flow chart illustrating a method for providing on-demand service activation including reactivating inactive services, according to some embodiments of the present disclosure.

FIG. 7 is a flow chart illustrating a method 700 for providing on-demand service activation including reactivating inactive services, according to some embodiments of the present disclosure. At step 702, a subscriber request for access to an inactive service is received. In one example, the subscriber request is received at the datapath engine. At step 704, the entry corresponding to the subscriber request is activated in the datapath engine. At step 706, the datapath engine notifies the corresponding vCPE of the wake-up of the requested service. At step 708, the vCPE notifies the cloud services manager to activate the requested service. At step 710, the requested service is started by the cloud services manager, and the container manager starts a service container for the requested service. At step 712, the tunnel associated with the requested service is established, and the datapath engine forwards the corresponding inner IP packet to the subscriber.

According to some implementations, the solution discussed above leverages the agility of container orchestration to meet a business need of residential broadband offerings, while offering a viable alternative strategy for elastic resource usage. The speed of operation of creating and deleting service in a justintime manner allows for datapath activity to trigger the creation and deletion of service containers. This differs from traditional virtualization technologies (VM) utilized by most broadband applications, since in traditional virtualization technologies, service containers remain present even when the respective services are inactive. Additionally, in some implementations, the datapath engine and vCPE are used to influence the service container orchestration. The infrastructure is extensible and can be leveraged beyond normal subscriber management for broader policy control.

According to one example, use activity or inactivity can be utilized to create and delete containers. In other examples, the triggers and actions are more sophisticated. For instance, the arrival of traffic with certain characteristics (specific website or traffic type) can be used to enable more specialized service containers to be started. In various examples, the specialized service containers include one or more of a virtual PBX (Private Branch Exchange), IVR (Interactive Voice Response), virtual storage, virtual media, and IoT. The specialized cases cannot be done using traditional VM based services. For example, systems that rely on virtual machines (VM) to achieve elasticity cannot be instantiated justintime. Any elasticity in VM resources needs to be planned for ahead of time. Additionally, orchestrating the creation and deletion of thousands of VMs is complicated, as VMs are primarily built for a semistatic environment. In some implementations, containers can be instantiated within VMs to provide elasticity. According to some examples, container orchestration services have become agile over the past few years. According to some implementation, systems and methods are provided for using containers to implement WV functionality and capability to provide elasticity to service appliances (based on data traffic).

Figure 8:
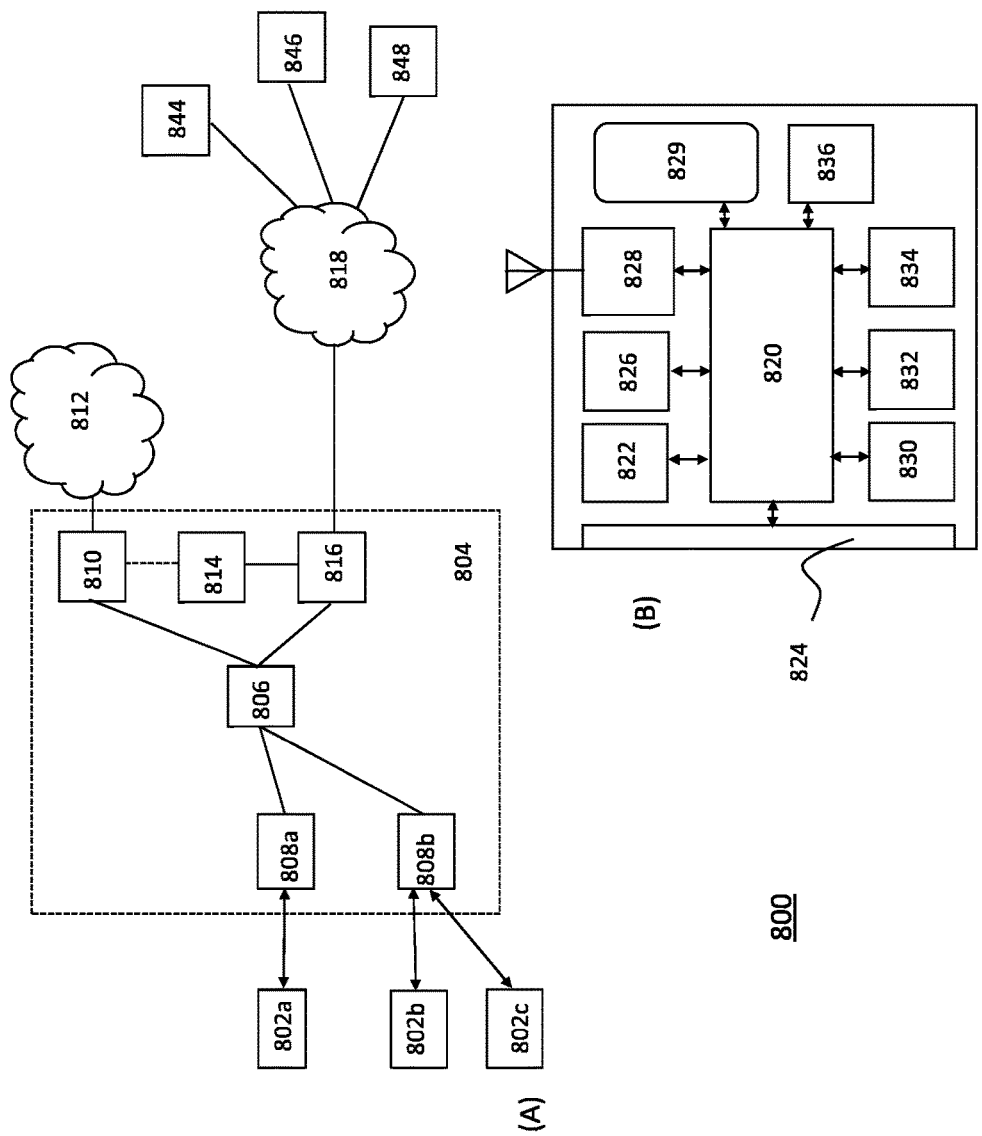
FIG. 8 depicts a block diagram illustrating an exemplary data processing system that may be used in a computing system as described with reference to FIG. 1.

FIG. 8 depicts a schematic of an illustrative networking system 800 for providing personalized virtualization services to CPE clients, which can be used in conjunction with the systems and methods discussed herein. The system 800 comprises one or more devices, or user equipment (UEs) 802a-c connected to wireless network 804. Exemplary user equipment can include mobile phones, smart phones, tablets, laptops, personal computers, wearables, smart cars, smart home controllers, consumer electronics, and any suitable computing devices and systems. The wireless network can includes networks which are implemented in accordance with the 2G-5G technologies. A wireless network may include a number of network access nodes 808, referred to, depending on the technology, as e.g. base stations (BSs) in GSM/GPRS, node Bs (NBs) in UMTS, or evolved node Bs (eNBs) in LTE, each covering a certain area (cell) by serving the UEs within that area (cell). The wireless network may further include a number of control network nodes 806, e.g. a Base Station Controller (BSC) in 2G-3G technologies, for controlling the network access nodes 808. In addition, the wireless network may include a Mobile Switching Centre (MSC) 810 for connecting UEs to fixed line telecommunications network 812, e.g. a PSTN, a subscriber information node 814, such as e.g. Home Location Register (HLR) in GSM/GPRS, comprising information associated with subscribers to the mobile services offered by the wireless network and a gateway node 816, such as e.g. Serving General Support Node (SGSN) in GSM/GPRS, for connecting UEs to one or more public or private external data networks 818, e.g. packet-switched networks such as the Internet. Alternatively and/or in addition UEs may be wirelessly connected to public or private data networks through a local Wi-Fi or WiMax network (not shown).

Each UE, schematically shown in more detail in FIG. 8(B), may generally comprise processor 820 for executing and managing Operating System (OS) 822, a User Interface (UI) including selectable display 824 and software applications (e.g., system applications, third-party applications), whose code may be stored in memory 826. Instances of said software applications is represented by element 829, which can include, for example, an email module for an email application. In some embodiments, said software applications may be executed by hardware such as processors, Application Specific Integrated Circuits (ASICs), and Field Programmable Gate Arrays (FPGAs). In certain embodiments, the functions of said software applications can be implemented at least in part in hardware (e.g., processors, ASICs, FPGAs, analog and/or digital circuitry). The OS may execute client software such as HTTP and/or SIP clients for setting up web-based services and/or streaming services. The UE may comprise radio module 828 comprising a base band processor (BP) for controlling the radio communications between the ME and an access node of a wireless network using a radio frequency communications interface. Network access and authentication may be controlled using a SIM card connected to the processor. According to various implementations, the UE accesses a system such as the system 100 in FIG. 1 to run software applications. In other implementations, the UE accesses a system such as the system 100 in FIG. 1 to access storage, such as network attached storage.

The UE may further comprise a digital imaging system 830 comprising a lens system, an image sensor and an imaging processor connected to the GUI which is configured to generate a camera view and sensor modules for generating positional information associated with the UE, i.e. the geo-coordinates and the attitude. Such sensor modules may include a GPS receiver module 832 for generating the geo-coordinates longitude and latitude of the mobile device, magnetometer 834 for determining direction (rotation around the vertical axis) and an accelerometer 836 for determining the tilt (the angle with respect to the earth's gravitation vector). In one embodiment, the tilt parameter generated by accelerometer 836 may be used for determining and displaying the horizontal plane in order to display objects correctly in the camera view. Other exemplary sensors may include light sensors, capacitive sensors, humidity sensors, etc.

In general, if a client is already installed on the UE, the stand-alone client stored in the memory of the UE may be activated by the user to provide services to the UE through the user equipment's operating system.

In the system depicted in FIG. 8, third parties, typically content providers 844, 846, 848 (e.g., third-party developers) can provide services to clients.

Figure 9:
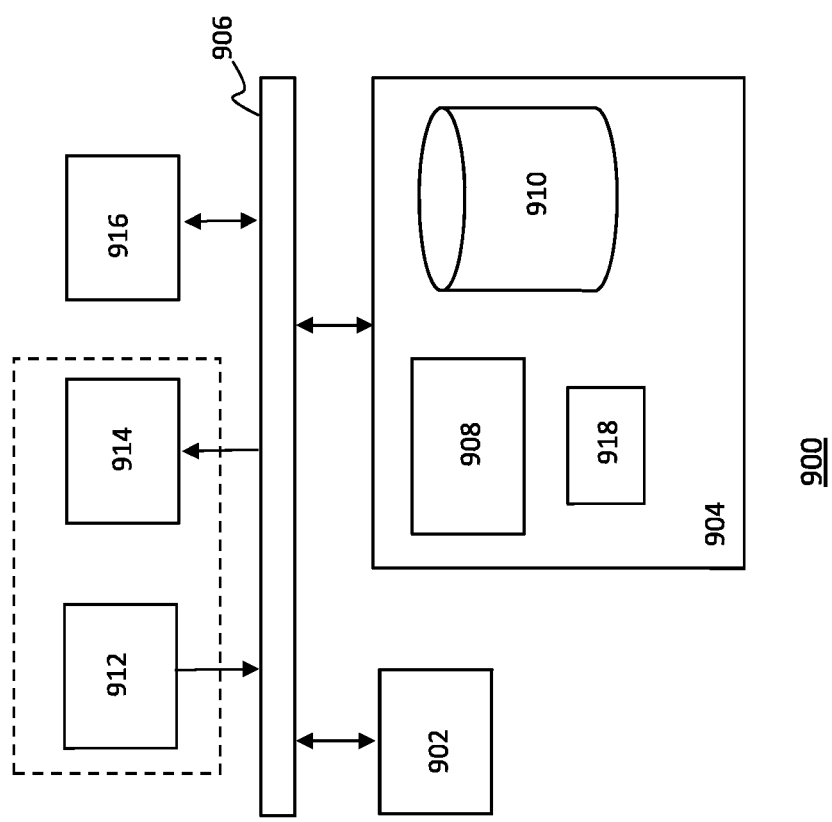
FIG. 9 depicts a schematic of an illustrative system for providing container services to CPE clients.

FIG. 9 depicts a block diagram illustrating an exemplary data processing system 900 that may be used in a computing system as described with reference to FIG. 1.

As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this specification.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

Input/output (I/O) devices depicted as an input device 912 and an output device 914 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter 916 may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

In another aspect, the data processing system 900 may represent a client data processing system. In that case, the application 918 may represent a client application that, when executed, configures the data processing system 900 to perform the various functions described herein with reference to a "client". Examples of a client can include, but are not limited to, a personal computer, a portable computer, a mobile phone, or the like.

Persons skilled in the art will recognize that while the elements 902-918 are shown in FIG. 9 as separate elements, in other embodiments their functionality could be implemented in lesser number of individual elements or distributed over a larger number of components.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 902 described herein.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the service activation operations thereof. This may be inclusive of appropriate algorithms and communication protocols that allow for the effective exchange of data or information.

In one implementation, network devices described herein may include software to achieve (or to foster) the functions discussed herein for triggering the instantiation of a customized service chain based on traffic pattern matching, where the software is executed on one or more processors to carry out the functions. This could include the implementation of instances of data processors, TCSM, residential gateways, CPEs, kubernates, and/or any other suitable element that would foster the activities discussed herein. Additionally, each of these elements can have an internal structure (e.g., a processor, a memory element, etc.) to facilitate some of the operations described herein. In other embodiments, these functions for service activation may be executed externally to these elements, virtually, or included in some other network element to achieve the intended functionality. Alternatively, network devices may include software (or reciprocating software) that can coordinate with other network elements in order to achieve the network device service activation functions described herein. In still other embodiments, one or several devices may include any suitable algorithms, hardware, software, components, modules, interfaces, or objects that facilitate the operations thereof.

In certain example implementations, the network device service activation functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to log active and inactive service functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving network device service activation, as outlined herein. Additionally, each of these devices may include a processor that can execute software or an algorithm to perform the service activation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using network devices for triggering the instantiation of customized service chains based on traffic pattern matching, as potentially applied to a myriad of other architectures.

It is also important to note that the steps in FIGS. 5-7 illustrate only some of the possible scenarios that may be executed by, or within, the network devices described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the network devices in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for triggering network function virtualization service activation for consumer equipment, comprising:
   receiving, at a virtual Customer Premises Equipment (vCPE) instance, a first request for a service;
   sending, from the vCPE instance to a container manager, a first indication to instantiate by the container manager a service container for the service and start the service in the service container;
   directing traffic from the vCPE instance to the service container for application of the service;
   receiving, at the vCPE instance from a datapath engine, a second indication of an idle timeout of the service;
   sending from the vCPE instance a third indication notifying the container manager that the service container is inactive and to remove the service container; and
   maintaining the vCPE instance to instantiate a new service container in response to a second request for the service.

2. The method of claim 1, wherein the datapath engine is configured to detect data flow to the service container and data flow from the service container.

3. The method of claim 2, wherein the datapath engine is configured to detect a lack of data flow to and from the service container.

4. The method of claim 2, further comprising receiving, from the datapath engine at the vCPE instance, data flow information.

5. The method of claim 2, further comprising installing, via the vCPE instance, a rule in the datapath engine to report, to the vCPE instance, a lack of data flow to and from the service container.

6. The method of claim 1, further comprising:
receiving, from the container manager at the vCPE instance, a DHCP request for an IP address for the service container; and
assigning the IP address to the service container.

7. The method of claim 1, further comprising:
receiving, at a control plane of the vCPE instance, a DHCP request from a physical customer premises equipment (pCPE); and
assigning, by the control plane, an IP address to the pCPE.

8. The method of claim 1, further comprising:
notifying the vCPE instance of the second request for the service; and
sending to the container manager an indication to instantiate the new service container for the service and start the service in the new service container.

9. A network device for triggering service activation comprising:
one or more network interfaces; and
one or more processors, wherein the one or more processors are configured to:
instantiate a virtual Customer Premises Equipment (vCPE) instance;
receive, via the one or more network interfaces, a first request for a service;
send, via the one or more network interfaces to a container manager, a first indication to instantiate a service container and start the service at the service container;
direct, via the one or more network interfaces, traffic from the vCPE instance to the service container for application of the service;
receive, from a datapath engine via the one or more network interfaces, a second indication of a timeout of the service;
send, via the one or more network interfaces, a third indication notifying the container manager that the service container is idle and to remove the service container; and
maintain the vCPE instance to instantiate a new service container in response to a second request for the service.

10. The network device of claim 9, wherein the datapath engine is further configured to detect data flow to the service container, detect data flow from the service container, and and detect the timeout by detecting, at the datapath engine, a lack of data flow to and from the service container.

11. The network device of claim 9, wherein the datapath engine is further configured to report data flow information to the vCPE instance.

12. The network device of claim 9, wherein the one or more processors are configured to:
receive, via the one or more network interfaces from the datapath engine, a notification of wake-up of the service, and
send, via the one or more network interfaces to the container manager, a notification to instantiate the new service container for the service and start the service in the new service container.

13. The network device of claim 9, wherein the one or more processors are configured to receive a DHCP request from a physical customer premises equipment (pCPE), and assign an IP address to the pCPE.

14. A computer-readable non-transitory medium comprising one or more instructions, for on-demand network function virtualization service activation, that when executed on one or more processors, configure the one or more processors to perform one or more operations comprising:
instantiating a virtual Customer Premises Equipment (vCPE) instance in response to a first request for a service;
receiving a first request for a service;
sending, to a container manager, a first indication to instantiate a service container for the service and start the service in the service container;
directing traffic from the vCPE instance to the service container for application of the service;
receiving, at the vCPE instance from a datapath engine, an indication of an idle timeout of the service;
sending from the vCPE instance a third indication notifying the container manager that the service container is inactive and to remove the service container; and
maintaining the vCPE instance to instantiate a new service container in response to a second request for the service.

15. The computer-readable non-transitory medium of claim 14, wherein the datapath engine is configured to detect data flow to the service container and data flow from the service container.

16. The computer-readable non-transitory medium of claim 15, wherein the one or more operations further comprise receiving, from the datapath engine, data flow information at the vCPE instance.

17. The computer-readable non-transitory medium of claim 14, wherein the datapath engine is configured to detect the idle timeout by detecting, at the datapath engine, a lack of data flow to and from the service container.

18. The computer-readable non-transitory medium of claim 14, wherein the one or more operations further comprises installing, via the vCPE instance, a rule in the datapath engine to report, to the vCPE instance, a lack of data flow to and from the service container.

19. The computer-readable non-transitory medium of claim 14, wherein the one or more operations further comprise:
receiving, at a control plane of the vCPE instance, a DHCP request from a physical customer premises equipment (pCPE); and
assigning, by the control plane, an IP address to the pCPE.

20. The computer-readable non-transitory medium of claim 14, wherein the one or more operations further comprise:
receiving, at the vCPE instance, a notification to wake-up of the service in response the second request for service; and
sending, to the container manager, a notification to instantiate the new service container and start the service in the new service container.

* * * * *